(12) United States Patent
Hansson

(10) Patent No.: US 7,289,110 B2
(45) Date of Patent: Oct. 30, 2007

(54) METHOD AND ARRANGEMENT FOR IDENTIFYING AND PROCESSING COMMANDS IN DIGITAL IMAGES, WHERE THE USER MARKS THE COMMAND, FOR EXAMPLE BY ENCIRCLING IT

(75) Inventor: Mårten Hansson, Höllviken (SE)

(73) Assignee: Human Messaging AB, Simrishamn (SE)

( * ) Notice: Subject to any disclaimer, the term of this patent is extended or adjusted under 35 U.S.C. 154(b) by 406 days.

(21) Appl. No.: 10/333,257

(22) PCT Filed: Jul. 16, 2001

(86) PCT No.: PCT/SE01/01638

§ 371 (c)(1),
(2), (4) Date: Jun. 30, 2003

(87) PCT Pub. No.: WO02/07074

PCT Pub. Date: Jan. 24, 2002

(65) Prior Publication Data

US 2004/0100508 A1    May 27, 2004

(30) Foreign Application Priority Data

Jul. 17, 2000    (SE) .................................... 0002691

(51) Int. Cl.
*G09G 5/00*    (2006.01)
(52) U.S. Cl. ...................... 345/173; 345/179; 345/522; 178/18; 178/19; 382/314
(58) Field of Classification Search ................. 345/173, 345/179, 522; 178/18, 19; 382/314
See application file for complete search history.

(56) References Cited

U.S. PATENT DOCUMENTS 5,652,412 A    7/1997    Lazzouni et al.

(Continued)

FOREIGN PATENT DOCUMENTS

EP    0865192 A2    9/1998

(Continued)

OTHER PUBLICATIONS

Translation of Japanese Official Action dated Nov. 17, 2006.

*Primary Examiner*—Richard Hjerpe
*Assistant Examiner*—Leonid Shapiro
(74) *Attorney, Agent, or Firm*—Harness, Dickey & Pierce, P.L.C.

(57) ABSTRACT

A user captures a digital image of a paper where the user has marked one or several objects or commands with a pen. The marking is done according to a predefined set of marking rules, which eases the separation of objects and commands later on. Examples of rules for marking objects or commands are encircling, underlining and highlighting. The embedded commands in the digital image can be associated with one or several objects in the digital image. The association is done according to a predefined set of association rules. The image is then transmitted to a computing device for processing. The transmission is using a cable, IR or RF technologies like Bluetooth or cellular telephony. The computing device is called "command-server". It identifies and separates objects and commands by analysing the digital image using the predefined set of marking rules. The command-server also identifies, interprets and associates commands with objects by analysing the digital image according to the predefined sets of marking rules and association rules. Finally the command-server initiate services related to the commands on the objects.

16 Claims, 6 Drawing Sheets

U.S. PATENT DOCUMENTS

| | | | | |
|---|---|---|---|---|
| 5,867,150 A | * | 2/1999 | Bricklin et al. | 345/173 |
| 6,081,261 A | | 6/2000 | Wolff et al. | |
| 6,628,847 B1 | * | 9/2003 | Kasabach et al. | 382/314 |

FOREIGN PATENT DOCUMENTS

| | | |
|---|---|---|
| EP | 0 987 622 A2 | 3/2000 |
| JP | 61-107468 | 5/1986 |
| JP | 62-105463 | 5/1987 |
| JP | 63-078275 | 4/1988 |
| JP | 2-23455 | 1/1990 |
| JP | 2-28771 | 1/1990 |
| JP | 3-025577 | 2/1991 |
| JP | 82-63688 | 10/1996 |
| JP | 10-260916 | 9/1998 |

* cited by examiner

METHOD AND ARRANGEMENT FOR IDENTIFYING AND PROCESSING COMMANDS IN DIGITAL IMAGES, WHERE THE USER MARKS THE COMMAND, FOR EXAMPLE BY ENCIRCLING IT

TECHNICAL FIELD

The present invention relates to methods for processing information in digital images. More precisely the invention is related to processing digital images that contains embedded commands that relates to a service that the user wants to be executed on the digital image.

BACKGROUND

Digital cameras that can capture digital images are widely spread around the world. These images can be transferred to a computer where they can either be stored for future retrieval or be sent as an attachment to an email. The receiver of the email can open the attachment and view the images in a dedicated application program. Such email could also be sent via a mobile phone containing or being connected to a modem.

It is a problem that the receiver of the digital image must perform any type of wanted processing of the digital image manually. If the digital image represents a picture, the receiver must open the picture in a software application where he can print or store the picture. If the digital image represents hand written text the receiver may want to open the image in a handwriting recognition software application that converts the image in to digital characters. Then the user may want to convert the characters into a file format that is known to a certain software word processing application.

Another problem is that the digital image may contain several objects that the user wants to perform various actions on. One object may contain typed or hand written text that needs to be interpreted by certain software that transforms it into digital characters. Another object may represent a digital picture that should be compressed or transformed into another picture file format. Known software applications are not precise in separating a digital image into objects like texts, pictures or sketches and are thus not suitable for automatically carry out different services for different objects contained in a digital image.

Yet another problem is that the sender of the digital image needs to go through a number of steps of fundamentally different nature e.g. capture the image by a digital camera, transmit it to a mobile phone or computer, start an email application program, insert the digital image in to an email, enter or look up the wanted email addresses of the receivers and then send the email.

SUMMARY OF THE INVENTION

In view of the above it is an object of the present invention to overcome the disadvantages of the prior art solutions and to provide a totally new type of solution for intelligent interpretation and processing of digital images.

This is achieved by methods and arrangements for analysing and separating a digital image in to objects and commands associated with the objects. The objects can then be subjects for different kinds of further processing which are related to the associated commands.

According to one aspect of the present invention the user uses a digital camera to capture a digital image of a paper where the user has written commands and objects. One or several commands and objects have been marked with a pen.

The marking is done according to a predefined set of marking rules, which eases the separation of individual objects and commands later on. Examples of rules for marking objects or commands are encircling, underlining and highlighting. The embedded commands in the digital image can be associated with one or several objects in the digital image. The association is done according to a predefined set of association rules. Because of the association rules it is possible to have different commands associated to different objects in the image. The image is then transmitted to a computing device for processing. The transmission is using a cable, IR or RF technologies like Bluetooth or cellular telephony. The computing device is called "command-server". It identifies and separates objects and commands by analysing the digital image using the predefined set of marking rules. The command-server also identifies, interprets and associates commands with objects by analysing the digital image according to the predefined sets of marking and association rules. The command server can interpret digital images consisting of both pre-printed text and graphics from e.g. an advertisement or brochure, and hand-written text filled in by the user. Finally the command-server initiate services related to the commands on the objects.

If the digital image only contains one object the marking of the object may be omitted since there is no need to separate it from other objects by the command-server.

An advantage of the present invention is that it provides a quick, simple, intuitive and automatic way of processing information contained in pictures. The user can perform advanced electronic messaging and other services without the need of a full-blown man-machine interface such as that of a regular computer. Examples of such services are:

Handwriting recognition of at least one object

Transformation of at least one object into a selected file format,

Print and send letter,

Store at least one object for future retrieval,

Enter at least one object in to, or synchronise with, a calendar database, an address book database or a "to-do" list database, Perform a financial transaction, Dialling a phone number, Storing a phone number, Send a request to the user to confirm the interpretation of commands or object before any service is initiated, and Fetch one or several digital images from a mass-storage for digital images, for further processing.

The user can tailor-make his/her own set of services, association rules and marking riles by editing his/her individual user profile.

It is to be understood that although the invention disclosed herein is fully capable of achieving the objects and providing the advantages described, the characteristics of the invention described herein are merely illustrative of the preferred embodiment. Accordingly, it is not intended that the scope of the invention be limited to details of the embodiments described. Equivalents, adaptations and modifications of the invention reasonably inferable from the description contained herein are included within the scope of the invention as defined by the appended claims.

DETAILED DESCRIPTION OF EMBODIMENTS

Figure 1:
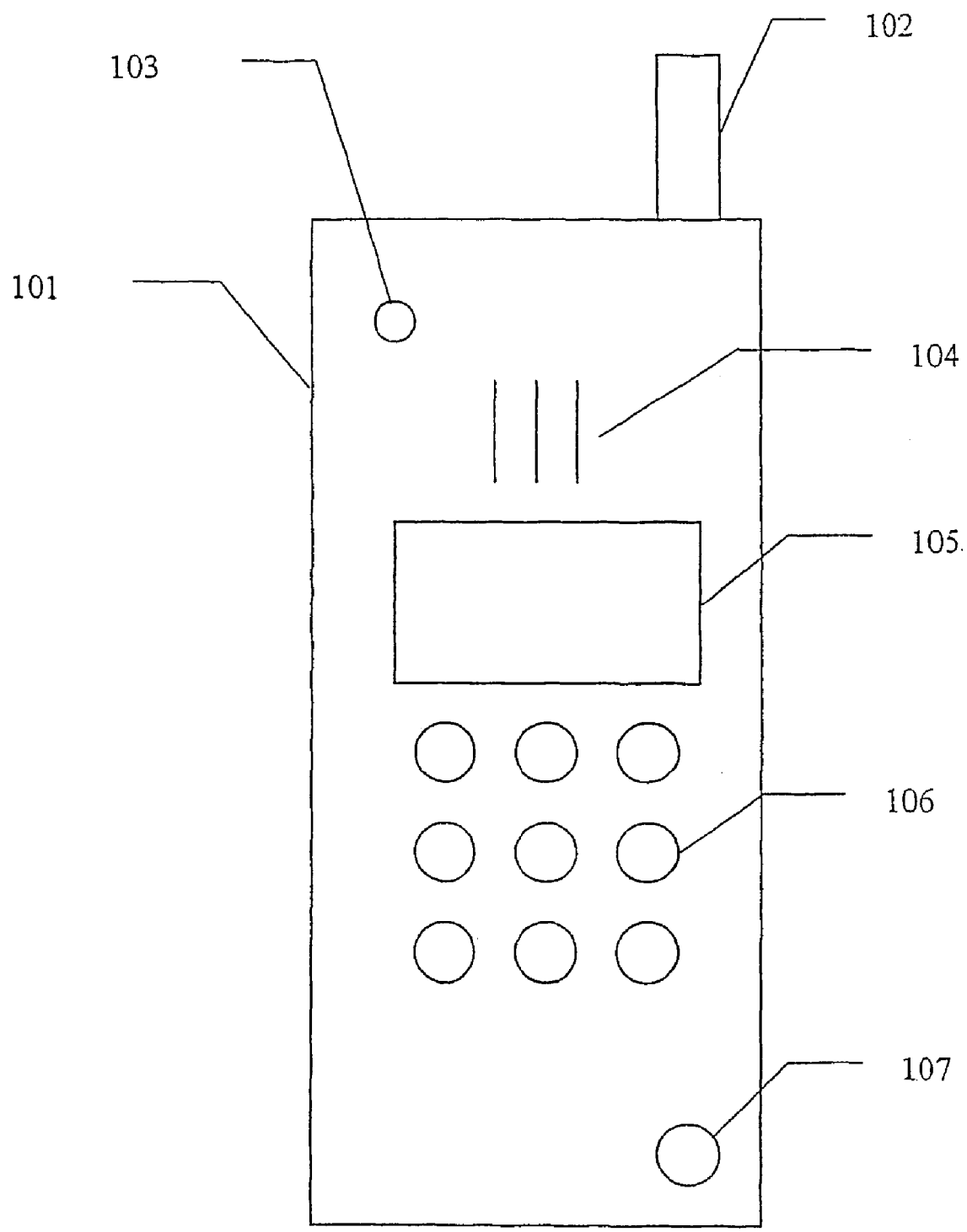
FIG. 1 is a schematic view of a mobile phone with an in-built digital camera.

FIG. 1 illustrates a mobile phone (101) with an in-built digital camera (103). The mobile phone has an antenna (102) for communicating with a cellular network, a loudspeaker (104), a display (105), a keypad (106) and a microphone (107). A possible variant is to use a separate digital camera that transfers the image to the mobile phone via the system connector, IR port or over a short range RF-link. Yet another alternative is that the image is captured by a digital camera or scanner and then is sent to a local computer hosting a command-server or being capable of sending the image over a network to another computer hosting a command-server that can process the digital image and initialise the services related to the commands.

Figure 2:
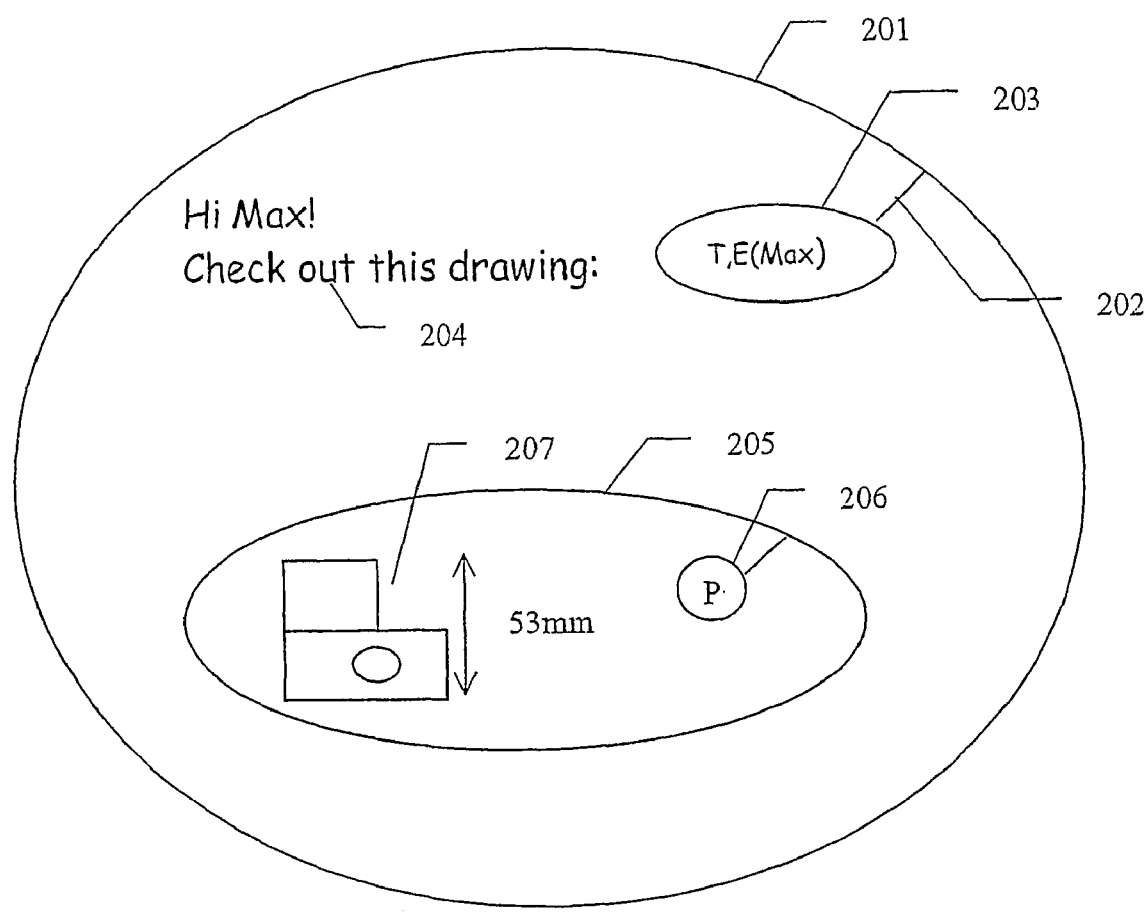
FIG. 2 is an example of a digital image of a paper containing encircled objects with associated commands.

FIG. 2 illustrates an example of a digital image representing information that is written with a pen on a piece of paper. The image contains one text object (204) and one picture object (207) that have been encircled (201, 205) with a pen according to a predefined set of marking rules. The user has written commands (206, 203) in conjunction with the circles according to a predefined set of association noes. The command (203) says "T,E(Max)". This tells the command-server that it should treat the encircled object as text ("T" as in text) and send it as an email to Max ("E" as in email). The circle command (206) says "P". This tells the command-server that this circle contains a picture. This information overrides that of the outer circle that indicated that it contained text. A line (202) between a circle and its associated command clarifies the relation according to a pre-defined set of association rules. The commands describe the kind of services the user wants to have executed on the objects contained in the circle. In this case the user wants the server to create and send an email to Max. "Max" is predefined by the user in the command-server's database and represents a nickname for the complete email-address of Max. The email body will contain one text part that is the result of the command-server's translation of the hand written text (204) into digital characters and one picture part contains a bit-map representation of the object (207).

Figure 3:
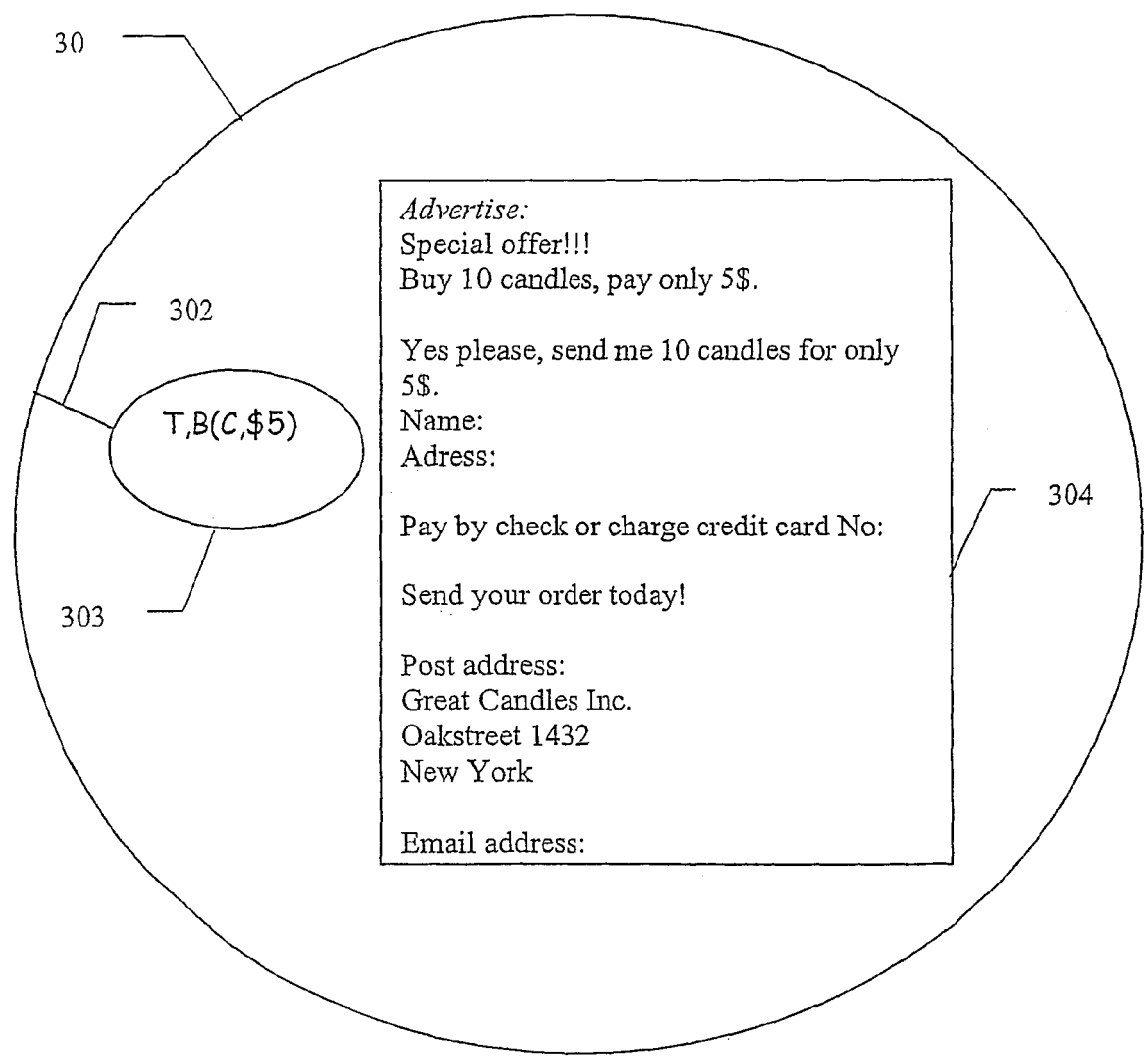
FIG. 3 is another example of a digital image of a paper containing encircled objects with associated commands.

FIG. 3 illustrates another example of a digital image representing a combination of pre-printed information and hand written circles and commands. The image contains advertisement for candles (304) that has been encircled (301) with a pen according to a predefined set of marking rules. The user has written commands (303) with associated parameters ("C, $5"), in conjunction with the circle (301). A line. (302) between the circle (301) and its associated command (303) clarifies the relation according to a pre-defined set of association rules. The command (303) describes what kind of services the user wants to have executed on the object (304) contained in the circle. In this case the user wants the command-server to analyse text ("T" as in text) in the related object (304) and also to put an order ("B" as in buy). The order should be paid by credit card ("C" as in credit card). The total amount of the order is equal to $5. The command-server will in this example interpret the text in the advertisement and look for an address to which the order can be sent. It then creates an email with a copy of the advertisement and the user's post address, credit card number and the amount of money the user accepts to be drawn from the credit card. The user's personal data has been pre-entered in the command-server's database.

The user uses predefined marking rules to ease the identification and separation of objects and commands in the digital image. Examples of how to mark an object or a command are:
  Encircling
  To draw a square box around it
  Underlining
  High-lighting with a special "marker pen"

In the case encircling is used as a predefined marking rule, the circles must not be perfect circles or ovals. Any reasonable graphical curve, which may encircle information, can be used. Whether or not the encircling curve must be closed or not in order to be interpreted as a circle may be left to the image processing to decide.

The user uses predefined association rules to associate commands to objects or vice versa. Examples of how to associate commands to objects are:
  Encircling of both the command and object
  Draw a line between the command and the object
  Draw a line between the command and the circle or square containing the object.

Association can be omitted if the digital image contains only one object.

Both the predefined set of marking rules and the predefined set of association rules may be specified in many various ways. Every user may customise the rules to their own preference. Such customisation may be stored in each user's profile.

It is possible to write with a pen on any type of pre-printed material such as paper, leaflets or photos. The user may mark objects that contain hand-written text, pre-printed text or pictures or a combination thereof, and then write commands that are associated to the objects using the predefined set of association rules.

A generic format of the commands may be defined as:
<Command1 (parameter1, parameter 2 . . . ), Command2 (parameter1, parameter2 . . . )

Some examples of commands and related parameters are listed here:

1. P,E (mag,mar)
   means that the digital image contains a picture (P) and that it should be sent by email (E) to the to receivers "mag" and "mar" which are nicknames that the user has associated to the real internet addresses of his friends Magnus and Maria.

2. T,E (mag,mar)
   means that the digital image contains text (T) that should be interpreted and transformed into digital characters by a handwriting recognition software before it is sent as an email (E) to the email addresses of "mag" and "mar".

3. D
   means that the associated object shall be discarded (D). This is used if the user regrets writing something.

4. M
   means that the associated object contains an appointment (M as in "meeting") that the command-server shall enter in to the user's electronic calendar for later retrieval or synchronisation with any of the user's computing devices.

5. TD means that the associated object contains a "To-do" item (TD) that the command server shall enter in to the user's electronic "To-do-list" for later retrieval by or synchronisation with any of the user's computing devices.

6. A means that the associated object contains an address item (A) that the circle server shall enter in to the user's electronic address book for later retrieval by or synchronisation with any of the user's computing devices.

7. P means that the associated object contains information about a financial transaction (P as in "Pay") that the command-server should perform on behalf of the user.

8. E(Pic 3, 6, 12, mar)

means that pictures (Pic) number 3, 6 and 12 shall be fetched from a digital camera or a mobile phone containing storage means for digital images, and be sent as part of an email to the address of "mar". The command may be associated with an object containing a handwritten or printed text message similar to that of a regular postcard. Here it is assumed that the device that stores the digital images can receive commands from the command server for fetching the pictures.

9. C,S means that the mobile phone shall dial a number that can be found in the associated object. It shall also store the number and the name, which also can be found in the associated object, in the phone book of the mobile phone. Here it is assumed that the mobile phone can receive commands from the command-server for dialling and storing, regardless of whether the command-server resides in the mobile phone or in an external computing device which it can communicate with.

The available command set may be personalised to individual needs. This may also be one of the bases for the subscription fee the user pays for using the command server.

The command-server may request the user to authenticate himself, before it accept to receive any data or digital images from the user or perform any action requested by the user. The authentication can be done in a similar way as it is done in mobile phones of GSM type, namely by a SIM card (Subscriber Identity Module). To further strengthen the security the server can request a pin code and also request that any data being sent is encrypted. Other ways of authentication can be done using an electronic signature or a written signature by the user contained in the picture.

Figure 4:
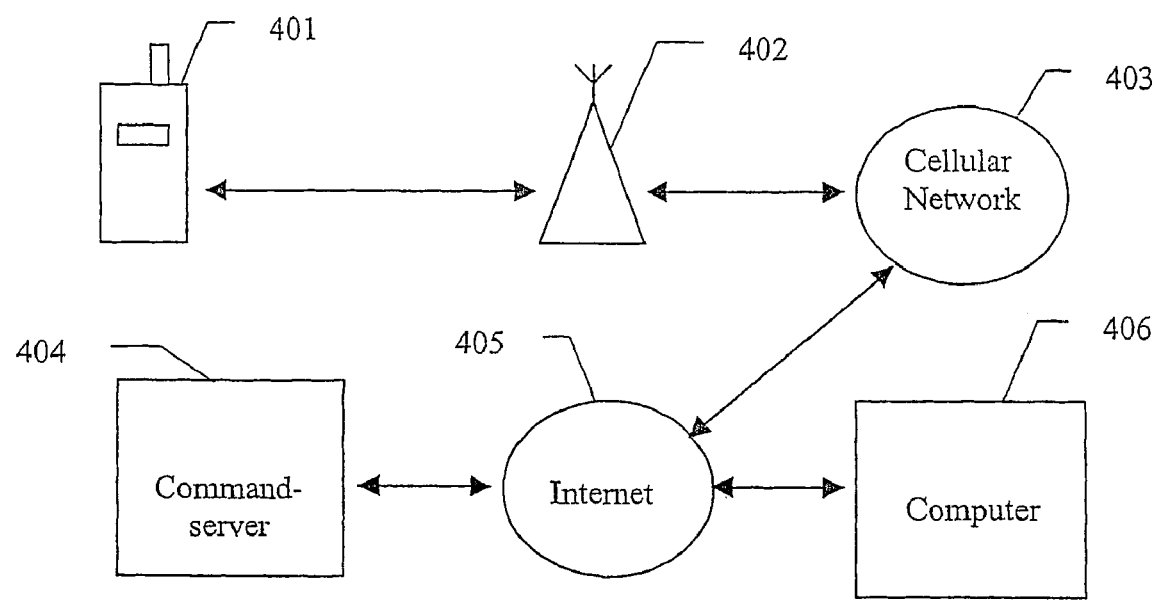
FIG. 4 is a schematic overview of an example embodiment of the whole system.

FIG. 4 illustrates an example embodiment comprising:
a mobile phone (401) containing an in-built digital camera, a cellular base station (402), a cellular network (403), the Internet (405), a command-server (404) and a standard computer (406). The digital image is sent from the mobile phone via the base-station to the cellular network that transports it to a selected command-server. The Internet address of the command-server is predefined by the user and stored in the mobile phone. This makes it unnecessary to enter the address of the command-server every time the user wants to use it. The command-server contains personal and stored information of the user including a customised user profile. The information can be accessed and modified from a general computer (406) that is connected to the internet. The user profile may also consist personal sets of marking and association rules and a set of available services.

Figure 5:
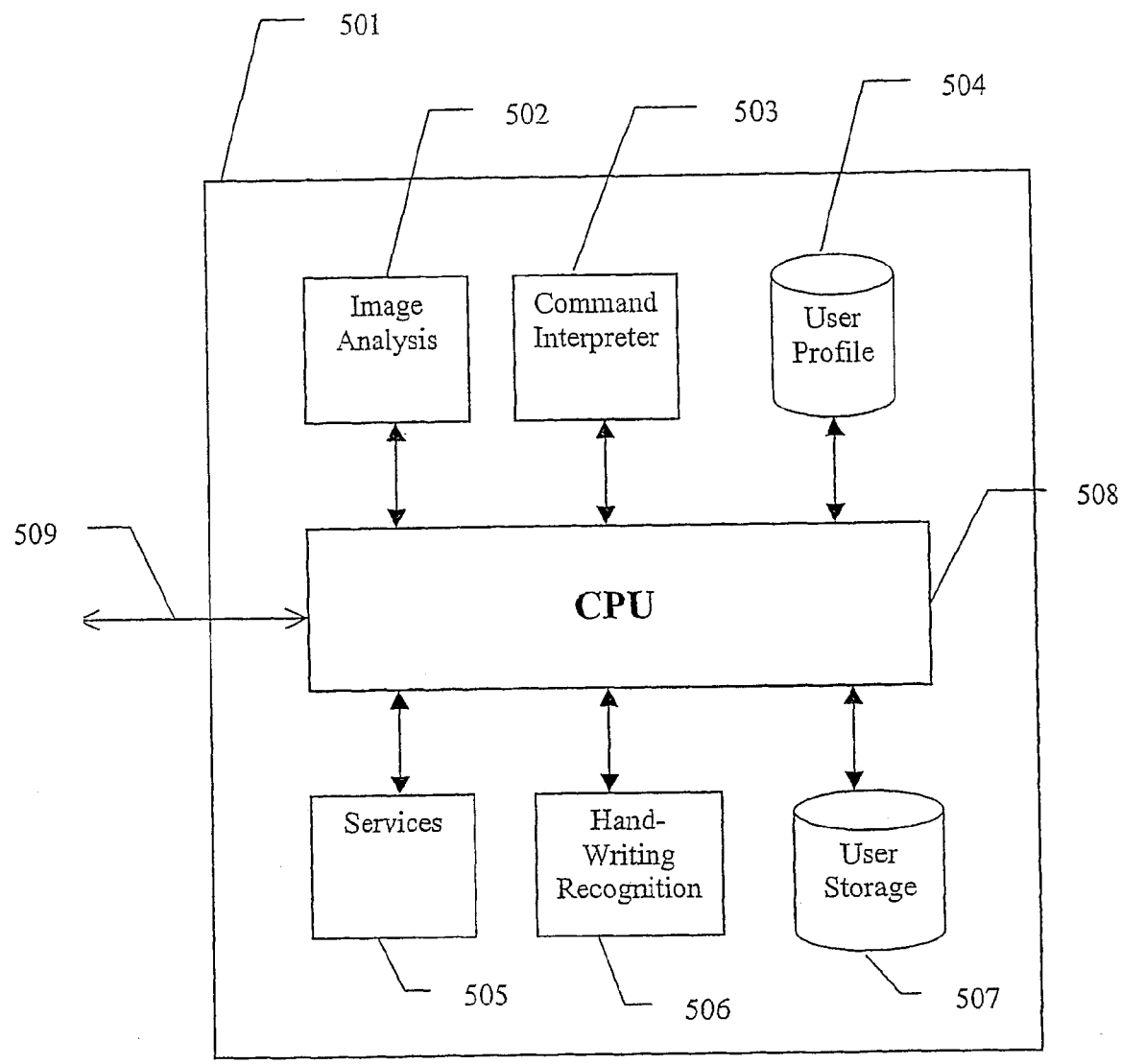
FIG. 5 is a schematic overview of the blocks of the command-server capable of analysing and processing digital images according to any contained commands.

FIG. 5 illustrates an example embodiment of the command-server (501) comprising:
A communication link to the Internet (509), a CPU (508), a database holding a User profile (504) and a storage area for user files (507). When the command-server receives a file containing a digital image from one of its users it starts to analyse the image. First it detects and separates the objects and commands by an image analysing SW (502). The SW uses the predefined set of marking rules. It also associates commands to objects using the predefined set of association rules. Then it interprets the identified commands by a Command interpreter SW (503), and finally it initiates various services (505, 506) on the objects. The services are chosen in accordance with the commands.

The database holding the User profile of the user (504) contains information related to the user such as:
Credit card number
Electronic Business card containing
  Name
  Title
  Post address
  Email address
  Fax number
  Home number
  Office number
  Mobile number
Address book containing nicknames for persons or groups and their complete data such as their email addresses. The address book in the circle server can be updated and maintained by the user from any computer over the Internet.
Calendar containing appointments etc.
A "To-do" list
Personalised set of marking rules
Personalised set of association rules
Personalised set of accessible commands and services The User storage area is used for storing copies of all imaged that has been processed and it also keeps a log all initiated services and any messages that have been sent out as a result of found commands.

The command-server can on demand by the user send various kinds of notices and status reports to the user, describing the activities that have been initiated through the processing of received digital images. The command-server may also notify the user about how it has interpreted the commands in the digital image and wait for a confirmation by the user before it initiates the wanted services.

The command-server is not limited to serve one single user. Separate User profiles and storage area can be kept for each user.

The user may update his profile and interact with the data storage at any time from any computer with access to Internet. The access can be protected by a password.

Although the invention has been disclosed as being implemented using different arrangements for recording the digital image, transmitting the digital image and processing the image, it may be feasible to implement more or less all hardware and software needed in one single unit. Such a unit may be a mobile user terminal, such as a mobile telephone, having a powerful digital processor and sufficient storage means. Another alternative is to host the command server in a digital camera or a combined digital camera and mobile phone. Generally speaking the digital camera, the mobile phone (when applicable) and the command server can be combined or distributed to any number of physically devices that can communicate direct or indirect with each other.

Figure 6:
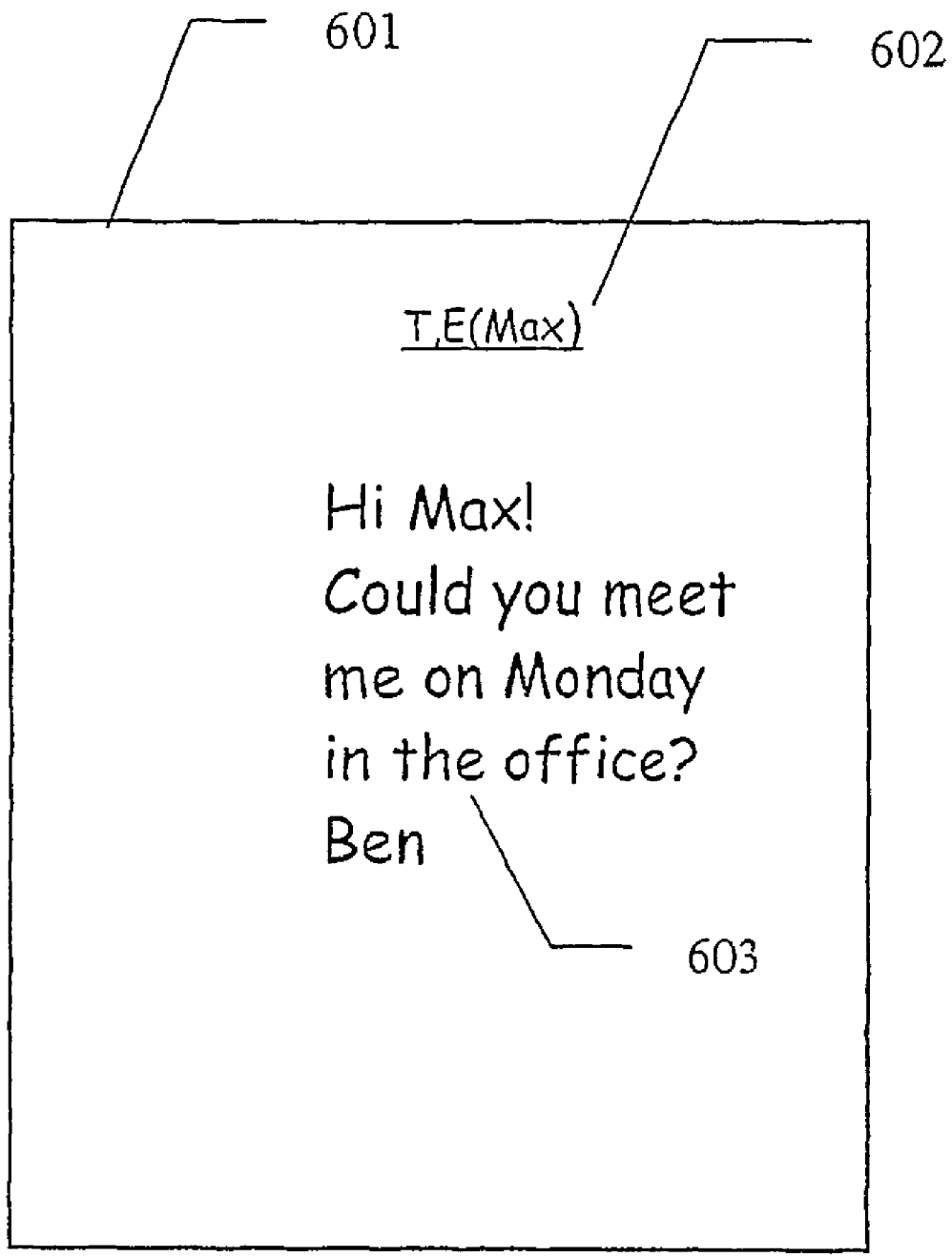
FIG. 6 is an example of a digital image representing a picture of a piece of paper containing a hand written message and an associated command.

FIG. 6 illustrates an example of a digital image representing a piece of paper (601) with a hand written message (603). The user has also written commands (602), which are underlined. The physical borders of the paper (601) may serve as an encircling of the single object (603). The hand written circle around the object has therefore been omitted.

The invention claimed is:

1. A method for processing information present in a digital image of an original picture, on which at least one graphical object and at least one processing command is marked on the digital image, the at least one processing command is pre-recorded on the digital image prior to processing the information, said method comprising the steps of:
   identifying, by using a predefined set of marking rules, the at least one graphical object in the digital image,
   identifying, by using the predefined set of marking rules, the at least one pre-recorded processing command in the digital image,
   identifying a relation between the at least one pre-recorded processing command and the at least one graphical object wherein the identification is performed by using a predefined set of association rules, and
   performing processing relating to the digital image, said processing being dependent on the at least one pre-recorded processing command.

2. A method according to claim 1, wherein the predefined set of marking rules contains at least one of the following marking rules:
   encircling the object or command,
   drawing a square box around the object or command,
   underlining the object or command, and
   high-lighting the object or command with a marker pen.

3. A method according to claim 1, wherein the predefined set of association rules contains at least one of the following association rules:
   encircling of both the command and object,
   drawing a line between the command and the object or their marking graphics, and
   drawing a line between the command and the circle or square containing the object.

4. A method according to claim 1, further comprising the step of customizing any of the set of marking rules and the set of association rules.

5. A method according to claim 1, wherein the processing involves initiating at least one of the services:
   handwriting recognition of at least one object,
   transform at least one object into a selected file format,
   send email,
   send fax,
   print and send letter,
   store at least one object for future retrieval,
   enter at least one object in to, or synchronize with, a calendar database, an address book database or a "to-do" list database,
   perform a financial transaction,
   dial a phone number,
   store a phone number,
   send a request to the user to confirm the interpretation of commands or object before any service is initiated, and
   fetch one or several digital images from a mass-storage for digital images, for further processing.

6. An arrangement for processing information present in a digital image of an original picture, on which at least one graphical object and at least one processing command is marked on the digital image, the at least one processing command is pre-recorded on the digital image prior to processing the information, said arrangement comprising:
   a device for identifying, by using a predefined set of marking rules, the at least one graphical object in the digital image,
   a device for identifying, by using the predefined set of marking rules, the at least one pre-recorded processing command in the digital image,
   a device for identifying a relation between the at least one pre-recorded processing command and the at least one graphical object wherein the identification is performed by using a predefined set of association rules, and
   a device for performing processing relating to the digital image, said processing being dependent on the at least one pre-recorded processing command.

7. An arrangement according to claim 6, wherein the predefined set of marking rules contains at least one of the following marking rules:
   encircling the object or command
   drawing a square box around the object or command
   underlining the object or command, and
   high-lighting the object or command with a marker pen.

8. An arrangement according to claim 6, wherein the predefined set of association rules contains at least one of the following association rules:
   encircling of both the command and object,
   drawing a line between the command and the object or their marking graphics, and
   drawing a line between the command and the circle or square containing the object.

9. An arrangement according to claim 6, further comprising a device for customizing any of the set of marking rules and the set of association rules.

10. An arrangement according to claim 6, wherein the device for processing of the object comprises a device for initiating at least one of the services:
    handwriting recognition of at least one object,
    transform at least one object into a selected file format,
    send email,
    send fax,
    print and send letter,
    store at least one object for future retrieval,
    enter at least one object in to, or synchronise with, a calendar database, an address book database or a "to-do" list database,
    perform a financial transaction,
    dial a phone number,
    store a phone number,
    send a request to the user to confirm the interpretation of commands or object before any service is initiated, and
    fetch one or several digital images from a mass-storage for digital images, for further processing.

11. A mobile communication terminal capable of processing information present in a digital image of an original picture, on which at least one graphical object and at least one processing command is marked on the digital image, the at least one processing command is pre-recorded on the digital image prior to processing the information, comprising:
    a device for obtaining the digital image of the picture,
    a device for identifying, by using a predefined set of marking rules, the at least one graphical object in the digital image, a device for identifying, by using the predefined set of marking rules, the at least one pre-recorded processing command in the digital image, a device for identifying a relation between the at least one pre-recorded processing command and the at least one graphical object wherein the identification is performed by using a predefined set of association rules, and a device for performing processing relating to the digital image, said processing being dependent on the at least one pre-recorded processing command.

12. A mobile communication terminal according to claim 11, wherein the predefined set of marking rules contains at least one of the following marking rules:

encircling the object or command, drawing a square box around the object or command, underlining the object or command, and high-lighting the object or command with a marker pen.

13. A mobile communication terminal according to claim 11, wherein the predefined set of association rules contains at least one of the following association rules:

encircling of both the command and object, drawing a line between the command and the object or their marking graphics, and drawing a line between the command and the circle or square containing the object.

14. A mobile communication terminal according to claim 11, further comprising a device for customizing any of the set of marking rules and the set of association rules.

15. A mobile communication terminal according to claim 11, wherein a device for processing of the object comprises means for initiating at least one of the services:

handwriting recognition of at least one object, transform at least one object into a selected file format, send email, send fax, print and send letter, store at least one object for future retrieval, enter at least one object in to, or synchronise with, a calendar database, an address book database or a "to-do" list database, perform a financial transaction, dial a phone number, store a phone number, send a request to the user to confirm the interpretation of commands or object before any service is initiated, and fetch one or several digital images from a mass-storage for digital images, for further processing.

16. A computer program, comprising software instructions to perform a method according to claim 1.

* * * * *